US008824989B2

(12) United States Patent
Jackson et al.

(10) Patent No.: US 8,824,989 B2
(45) Date of Patent: *Sep. 2, 2014

(54) SIGNAL DEGRADATION DETECTION

(71) Applicant: Echostar Technologies L.L.C., Englewood, CO (US)

(72) Inventors: Robert J.V. Jackson, Englewood, CO (US); Tianhua Zhang, Superior, CO (US); Moutaz Elkaissi, Highlands Ranch, CO (US); Hao Nguyen, Denver, CO (US); Jorge Sotelo, Denver, CO (US); Wendell Blackman, Denver, CO (US); Greg Goldey, Castlerock, CO (US)

(73) Assignee: EchoStar Technologies L.L.C., Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/725,295

(22) Filed: Dec. 21, 2012

(65) Prior Publication Data
US 2013/0109336 A1    May 2, 2013

Related U.S. Application Data

(63) Continuation of application No. 12/823,789, filed on Jun. 25, 2010, now Pat. No. 8,364,107.

(51) Int. Cl.
H04B 17/00    (2006.01)

(52) U.S. Cl.
USPC ..... 455/226.1; 455/427; 455/437; 455/552.1; 455/456.1; 455/456.2

(58) Field of Classification Search
CPC .................................................. H04B 17/0075
USPC ............... 455/226.1, 427, 437, 552.1, 456.1, 455/456.2
See application file for complete search history.

(56) References Cited

U.S. PATENT DOCUMENTS

| 5,235,619 | A | 8/1993 | Beyers, II et al. |
| 5,995,832 | A | 11/1999 | Mallinckrodt |
| 6,445,907 | B1 | 9/2002 | Middeke et al. |
| 7,298,327 | B2 | 11/2007 | Dupray et al. |
| 7,525,484 | B2 | 4/2009 | Dupray et al. |
| 7,764,231 | B1 | 7/2010 | Karr et al. |
| 8,364,107 | B2 * | 1/2013 | Jackson et al. ............. 455/226.1 |

(Continued)

OTHER PUBLICATIONS

International Search Report and Written Opinion, dated Dec. 5, 2011, for PCT/US2011/036226, 15 pages.

(Continued)

Primary Examiner — Sanh Phu
(74) Attorney, Agent, or Firm — Seed IP Law Group PLLC

(57) ABSTRACT

Implementations are directed to predicting signal degradation at receivers used to display a programming service. The receivers capture signal strength data that is then transmitted to a processing location, which may be associated with a provider of the programming service. A signal degradation detector at the provider operates to predict whether or not a future unacceptable signal quality will occur within a time interval. The prediction may be based on a test quantity calculated from signals captured at the receiver and based on a figure of merit for the geographic locale in which the receiver is located. A maintenance call may be initiated for those receivers that have such a poor signal quality.

20 Claims, 4 Drawing Sheets

(56) References Cited

U.S. PATENT DOCUMENTS

| | | |
|---|---|---|
| 2003/0028891 A1 | 2/2003 | Hardt et al. |
| 2004/0237116 A1 | 11/2004 | Allen |
| 2005/0114879 A1 | 5/2005 | Kamieniecki |

OTHER PUBLICATIONS

Taiwan Office Action, dated Apr. 14, 2014, for Taiwan application No. 100122071, 4 pages.

* cited by examiner

SIGNAL DEGRADATION DETECTION

CROSS-REFERENCE TO RELATED APPLICATIONS

This application is a continuation of U.S. patent application Ser. No. 12/823,789, filed Jun. 25, 2010, currently allowed, where this application is incorporated herein by reference in its entirety.

BACKGROUND

1. Technical Field

Implementations discussed herein are generally directed to predicting, at a service provider, future signal degradation at receivers used to display a programming service.

2. Description of the Related Art

At the present, signal degradation can be a significant barrier to customer satisfaction in industries that provide service to customers across an electronic transmission medium. In the satellite television industry and in any broadcasting industry, customers receive program service through a satellite or terrestrial broadcast or across a cable network. Customer-side equipment or components that are used to receive signals or display content sent by a service provider may degrade or fail over time, leading to a loss in signal. In addition to the television industry, signal degradation may occur in other contexts such as the transmission of information across the Internet or other computer-accessible medium (including a local area network, wide-area network, and so on), including Internet protocol television transmissions, a wireless network such as a radio frequency or infrared network, and so on.

Overcoming the problems presented by signal degradation involves two distinct hurdles: first, gathering data on signal quality/strength; and second, identifying customers adversely affected by poor signal quality/strength. Recently, major strides have been made in the first area. For example, at Dish Network approximately one half of the company's 14,000,000 customers possess receivers that automatically send signal strength numbers to a central data base, where they can be reviewed. Embodiments discussed herein are directed to the second hurdle in overcoming signal degradation problems, namely how to identify signal degradation over periods of time that are both short enough to make a timely response to customers' service problems, and long enough to avoid bothering them about temporary outages that will automatically correct themselves.

BRIEF SUMMARY

Implementations discussed herein are directed to predicting signal degradation at receivers used to display a programming service. The receivers capture signal strength data that is then transmitted to a processing location, which may be associated with a provider of the programming service. A signal degradation detector at the provider operates to predict whether or not a future unacceptable signal quality will occur within a time interval. A maintenance call may be initiated for those receivers that have such a poor signal quality. The prediction may be based on a test quantity calculated from signals captured at the receiver and based on a figure of merit for the geographic locale in which the receiver is located. The prediction may be a two part process in which, at a first level, a receiver may be excluded from a maintenance call if the test quantities and the figure of merit indicate an acceptable signal quality. At a second level, a receiver may qualify for a maintenance call if a linear equation calculated for the receiver indicates a future unacceptable signal quality within the time interval.

One embodiment is directed to a method for providing maintenance to a receiver, comprising: determining a time series of test quantities for a receiver based on signal strength measurements collected at the receiver at plurality of time instances; receiving a figure of merit for the receiver, the figure of merit indicating an expected signal quality for the receiver; determining a failure prediction for the receiver based on a linear function computed from the time series of test quantities and the figure of merit; and providing maintenance to the receiver if the failure prediction indicates a future unacceptable signal strength for the receiver.

Another embodiment is directed to a method for providing maintenance to a plurality of receivers, comprising: receiving signal histories for a first group of receivers; identifying a second group of receivers by selecting, from the first group of receivers, those receivers that have a downward trending signal strength and a signal strength below a predetermined level for at least one time instance; creating a linear signal strength function for each receiver in the second group of receivers based on the signal history for the receiver and the predetermined level; identifying a third group of receivers by selecting, from the second group of receivers, those receivers whose linear function has a slope and an intercept that indicate a future unacceptable signal strength; and providing maintenance to the third group of receivers.

Still another embodiment is directed to a system for providing maintenance to a receiver, comprising: a test quantity module operable to determine a time series of test quantities for a receiver based on signal strength measurements collected at the receiver at plurality of time instances; a figure of merit module operable to receive a figure of merit for the receiver, the figure of merit indicating an expected signal quality for the receiver; and a prediction module operable to determine a failure prediction for the receiver based on a linear function computed from the time series of test quantities and the figure of merit.

DETAILED DESCRIPTION

Implementations discussed herein are directed to predicting signal degradation at receivers used to display a programming service. The receivers capture signal strength data that is then transmitted to a processing location, which may be associated with a provider of the programming service. A signal degradation detector at the provider operates to predict whether or not a future unacceptable signal quality will occur within a time interval. A maintenance call may be initiated for those receivers that have such a poor signal quality. The prediction may be based on a test quantity calculated from signals captured at the receiver and based on a figure of merit for the geographic locale in which the receiver is located. The prediction may be a two part process in which, at a first level, a receiver may be excluded from a maintenance call if the test quantities and the figure of merit indicate an acceptable signal quality. At a second level, a receiver may qualify for a maintenance call if a linear equation calculated for the receiver indicates a future unacceptable signal quality within the time interval.

Figure 1:
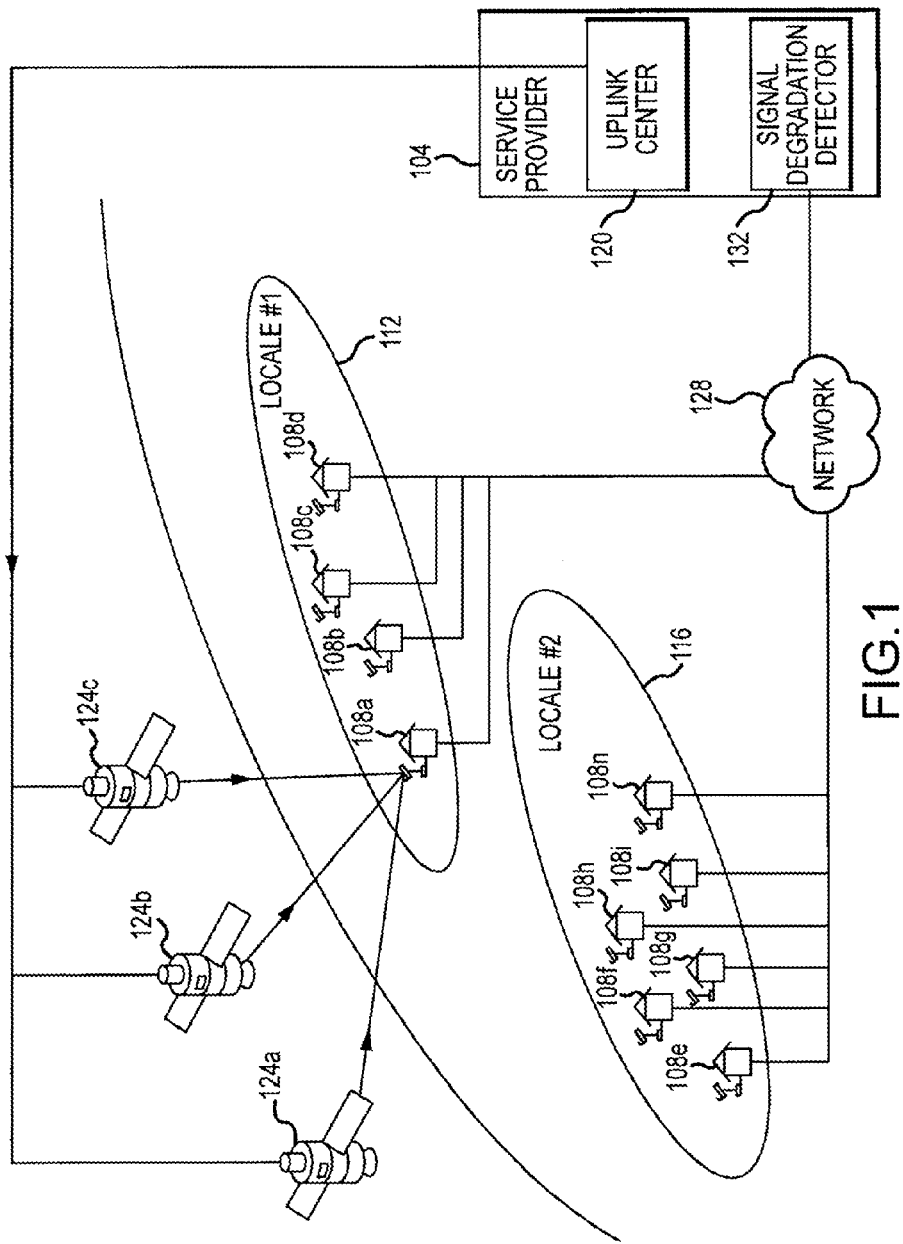
FIG. 1 is a schematic illustration of a general operating environment for implementations discussed herein.

FIG. 1 is a schematic illustration of a general operating environment showing components and features of embodiments discussed herein. FIG. 1 includes a service provider 104 that transmits or otherwise provides a program service transmission to a number of users or subscribers. The program service transmission may be received through a subscription to the service. Generally the terms "user" and/or "subscriber" refer to an individual or company who receives a program service transmission. This may include those who have purchased a subscription to the program service transmission. Additionally, the terms "user" and/or "subscriber" may refer to individuals who have been given access to the program service transmission through promotional offers and/or other non-fee-based agreements. By way of illustration, the subscribers to the program service are represented in FIG. 1 as a number of households 108a-n.

The households 108a-n that receive the program service may be located in a number of different geographic locations. The operating environment shown in FIG. 1 includes a first geographic locale 112 and a second geographic locale 116. Households 108a-d are located within the first geographic locale 112, and households 108e-n are located within the second geographic locale 116.

In one embodiment, the service provider 104 may be a satellite television provider and so provide a program service transmission through an uplink center 120. Implementations discussed herein may utilize a direct broadcast satellite (DBS) system which can incorporate packetized transmission signals according to an appropriate standard, such as the MPEG-2 standard. The uplink center 120 may include a transmitter or other equipment operable to transmit a modulated signal having data representing audio and/or visual content. The modulated signal may be received at one or more satellites 124a-c, which in turn retransmit the modulated signal to be received at one or more terrestrial locations 108a-n. The modulated signal may be transmitted from the satellites 124a-c over an appropriate frequency band such as, for example, the C-band, the Ku-band or the Ka-band.

Figure 2:
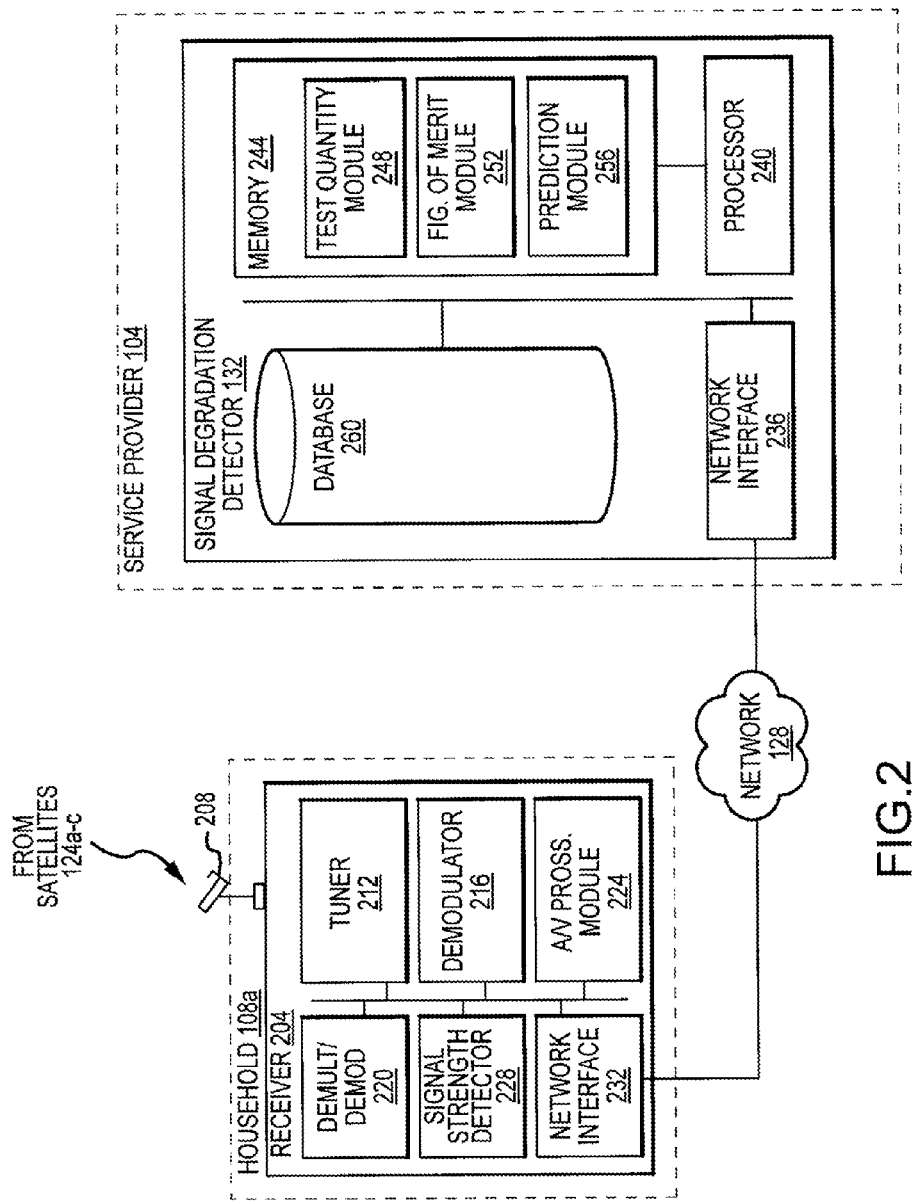
FIG. 2 is a schematic illustration of components and features of embodiments discussed herein.

The modulated signal maybe received at the one or more terrestrial locations or households 108a-n through the operation of a receiver 204, shown in detail in FIG. 2. As used herein, a "receiver" may be any device capable of receiving video and/or audio content included in a broadcast or other program service transmission from a service provider. For example, a receiver may include a set-top, a cable box, general purpose computer, and so on. As used herein, a service provider may include any service that provides a program service transmission to a receiver such as, without limitation, a satellite television service, a direct television service or a cable television service. It should be understood that the term "program service transmission" generally embraces not only satellite or terrestrial broadcasts and/or narrowcasts but also transmission of information across any wired or wireless transmission medium. Accordingly, a "program service transmission" encompasses transmission of information across a cable network (for example a cable headend to cable receiver), an Internet or other computer-accessible medium (including a local area network, wide-area network, and so on), including Internet protocol television transmissions, a wireless network such as a radio frequency or infrared network, and so on.

Direct broadcast satellite DBS signals maybe received as downlinked signals by a satellite antenna 208. The downlinked, L-band signals may be received by a tuner 212, which selects a specific frequency range. The L-band signals received by the tuner 212 may include a number of transponder signals received from one or more satellites 124a-c. A particular transponder signal may include a combination or multiplex of a number of transport streams associated with one or more channels. A particular transport stream may include, for example, compressed or uncompressed audio or visual data. By applying band-pass filtering techniques, the tuner 212 may select a particular transponder signal from the group of signals received from the LNBF.

The transponder signal selected by the tuner 212 may then be demodulated by the demodulator 216. Specifically, the demodulator 216 removes the sinusoidal carrier signal and outputs the information carrying signal as a baseband signal. Output from the demodulator 216 may be directed to a demultiplexer/decoder 220. The demultiplexer/decoder 220 may be an integrated circuit that accepts the packetized, time domain multiplexed data stream of the MPEG-2 transport stream and routes the packets to various components for further processing. In so doing, the demultiplexer/decoder 220 may separate out various transport streams that are contained in a particular transponder signal. A transport stream may include a number of packets having a unique packet identification (PID). In addition to routing packets of data, the demultiplexer/decoder 220 may also unscramble encrypted data and/or provide buffering of the MPEG data.

A number of transport streams may together form a service. As used herein, a "service" refers to a particular channel which is selected by a user. A particular video channel typically includes three transport streams: a video stream, an audio stream, and a data stream. The demultiplexer/decoder 220 may include an audio decompressor portion that is operable to decompress an audio stream, and a video decompressor portion that is operable to decompress a video stream. The audio stream and video stream may be fully compliant audio and video program elementary streams as defined by, for example, ISO 13818-2 and ISO 13818-3 of the MPEG-2 standard, respectively. Output from the demultiplexer/decoder 220 may be directed to an audio visual (NV) processing module 224. The AN processing module 224 may process the video and audio streams using digital-to-analog conversion techniques, or compressed digital to uncompressed digital conversion techniques, to produce one or more output signals. The resulting baseband signals may then be sent to an output device through appropriate connections. By way of example and not limitation, the output device may include a television, a monitor, and/or a speaker system, and so on.

Again, it should be noted that embodiments may operate with different product transmission services. Accordingly, although a satellite system is provided as an example of a program service transmission system, it should be understood that other networks or broadcasts for transmitting data may be used by alternative embodiments. For example, embodiments may be implemented in connection with a cable service. In this case, the service provider 104 and the receiver may communicate over a communication path that includes various combinations of local and wide area networks and/or the Internet. In such embodiments, the receiver may be configured to access a web site, a file transfer protocol (FTP) site, a file sharing system or site, and so on.

The receiver 204 may include a signal strength detector 228 that is operable to measure signal quality at the receiver 204. The measured signal quality is not dependent on the hardware used to convey the program service transmission or to produce the programming at the receiver 204. Rather, the measured signal quality represents a measure of the programming as it is viewed and/or heard by a user. A separate signal quality measurement may be made for each service or channel available to the receiver 204 through the one or more satellites 124a-c. In one embodiment, signal quality is measured with respect to an expected signal quality for geographic locale in which the receiver 204 is located. For example, the signal quality may be expressed as percentage of the highest quality signal that is available in the geographic locale in which the receiver 204 is located. With reference to FIG. 1, signal quality measured at receiver 204 in household 108a may be expressed a percentage of highest signal quality available in the first geographic locale 112. The highest available signal quality for a given geographic locale may be determined by empirical measurements and/or known radio frequency estimation techniques.

The receiver 204 may send the signal strength measurements made by the signal strength detector 228 to the service provider 104. In this connection, the receiver 204 may include a network interface 232. The network interface 232 may be generally operable to communicate or send information across a network 128. In accordance with certain embodiments discussed herein, the network interface 232 may include a modem. Using a modem, the receiver 204 may communicate over a network 128 that includes standard telephone lines associated with the public switched telephone network (PSTN). However, it should be appreciated that the network 128 may include any type of network capable of data communication, such as for example, a local or wide area network or the Internet. In this regard, the receiver 204 may communicate through the network interface 232 using any suitable communication protocol such as TCP/IP.

As shown in FIG. 1, the service provider 104 may additionally include a signal degradation detector 132. The signal degradation detector 132 may be in communication with households 108a-n across the network 128. As described above in connection with household 108a, households 108b-n may also include a receiver 204 having a signal strength detector 228 operable to measure local signal quality. Accordingly, the households 108a-n may all gather signal quality data and send this data to the signal degradation detector 132 via the network 128. A particular signal strength detector 228 may conduct static measurements of signal quality when the receiver 204 is not being used by a subscriber. This may include cycling through all available channels or services available at the receiver 204. The signal strength detector 228 may conduct signal strength measurements on a periodic basis at an appropriately chosen interval. In accordance with embodiments discussed herein, the signal strength detector 228 may conduct signal strength measurement on bi-weekly, weekly, twice-weekly, daily basis, or on basis of another convenient time interval.

The manner in which the service provider 104 uses signal quality data measured at the households 108a-n may be understood with reference to FIG. 2, which includes a detailed illustration of the signal degradation detector 132. As can be seen, the signal degradation detector 132 may include a network interface 236 operable to communicate with households 108a-n across the network 128. The signal degradation detector 132 may also include a processor 240 operable to run executable code in connection with various functions associated with the signal degradation detector 132. The processor 240 may be provided in association with a memory or other computer readable storage device 244, such as magnetic, optical or tangible media. The memory 244 may store an application, file, module or other data that is useable by the processor 240. As used herein, an application or module includes processor executable code that may be run to carry out one or more functions associated with the signal degradation detector 132. "Processor executable code" includes any computer-readable media or commands that may be ultimately interpreted by a processor, such as HTML or XML files that are rendered into user-viewable applications by an application executed by the processor 240. The signal degradation module may additionally include a database 260 that provides for long term storage of data for use by the various processor-executable modules.

As shown in FIG. 2, the memory 224 includes three processor-executable modules: a test quantity module 248, a figure of merit module 252, and a prediction module 256. As described in greater detail below, the test quantity module 248 and the figure of merit module 252 calculate or otherwise determine test parameters that are used by the prediction module 256 to estimate or predict that a particular receiver 204 will experience an unacceptably poor signal quality in the future within a given time frame. If the prediction module 256 predicts a future poor signal quality for a particular receiver 204, the service provider 104 may initiate a maintenance call or "truck roll" for the household 108a-n associated with particular receiver 204.

The test quantity module 248 is operable to produce a time series of test quantities for each particular receiver 204 associated with the households 108a-n. The time series of test quantities includes an individual test quantity for each time instance in which signal quality measurements were taken at the particular receiver 204. The signal quality data may be processed as it arrives at the signal degradation detector 132 or it may be stored for later processing in the database 260. The test quantity module 248 may operate on a number of signal quality histories taken over a time interval for a collection of receivers 204. The signal quality data represents signals that are measured at the receiver 204, independently of the means of communication: satellite, cable, and so forth. The window of time and the number of samples are chosen to provide enough granularity to accurately reflect reality in the respective channel.

The test quantity module 248 may use historical trends of signal strength in order to judge the condition of the signal quality histories. The historical trends establish dependable bounds on signal quality and so may be used to independently judge the overall effectiveness of each channel. In terms of such auxiliary information, the test quantity module may use the following signal quality definitions:

$$\text{Upper level (of signal quality)} = \text{minimum value of acceptable signal reception.} \quad (1)$$

$$\text{Lower level (of signal quality)} = \text{maximum value of unacceptable performance.} \quad (2)$$

The signal degradation detector 132 may choose particular receivers 204 as candidates for analysis on the basis of two criteria: geographic locale and a time interval, herein termed a "window size." The physical location may be dictated by the regions over which the two previous levels of quality are valid. The window over which to analyze the histories is typically long enough to detect real problems, and short enough to be responsive to the customer service issues in real time.

On the basis of this information, the test quantity module 248 generates a test quantity ("TQ") for each receiver 204. Suppose that a given receiver may receive N different signal channels. In accordance with embodiments discussed herein, the test quantity considers each of these channels because degradation in any one of them could cause issues for the customer. Let the signal strength in each of those channels be represented by the symbol $C_k$ for k=1, 2, ..., N. The test quantity is then the geometric mean of these strengths, namely, $$TQ \equiv \sqrt[N]{\prod_{k=1}^{N} C_K}. \quad (3)$$

An advantage of taking the product of all the strengths is that a diminution in any one of them will lead to a reduction in the test quantity. The Nth root is taken in order to restore the test quantity to the average size of any one of the given channel strengths. For example, were each $C_k$ given as a percentage between zero and one hundred; then, the test quantity would also be a percentage between those limits.

The test quantity is compared to a figure of merit ("FoM") that may be constructed by the figure of merit module 252 on the basis of auxiliary considerations about the channels. The figure of merit module 252 may calculate each figure of merit from radio frequency data stored in the database. In one embodiment, the database 240 stores a number of pre-calculated figures of merit, and the figure of merit module 252 operates to retrieve this stored data. The figure of merit represents an expected signal quality for a group of receivers 204. Without regard to an individual receiver 204, but employing the geographic locale in which the group of receivers 204 reside, the figure of merit module 252 makes a choice of two different, representative channels that bracket the overall behavior. These may be the strongest and the weakest channels, which are denoted by ST and WK, respectively. Correspondingly, these two channels have known upper and lower levels as defined in (1) and (2) respectively. With these definitions in mind, the figure of merit module 252 may calculate the figure of merit as the square root of two terms, the upper level of the strong channel and the lower level of the weak channel or vice versa, that is:

$$FoM=\min\{\sqrt{\text{upper}(ST) \times \text{lower}(WK)}, \sqrt{\text{lower}(ST) \times \text{upper}(WK)}\}. \quad (4)$$

This calculation represents a standard of quality independent of the individual receivers 204 in a given area over some period of time; it is also a standard that can evolve as more understanding is obtained.

Figure 3:
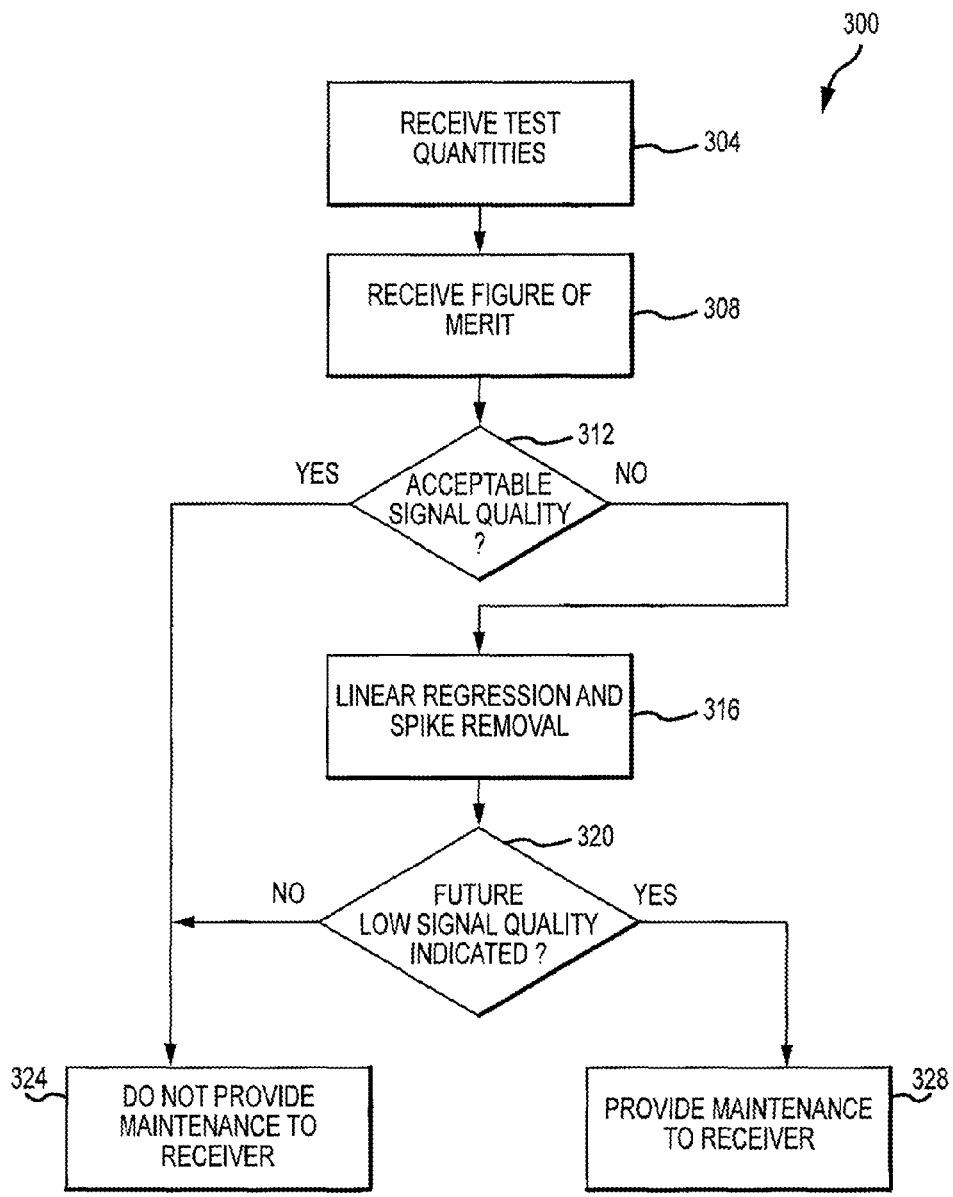
FIG. 3 is a flow chart that illustrates the operation of the prediction module shown in FIG. 2.

FIG. 3 is a flow chart that illustrates the operation of the prediction module 256. The flow chart 300 illustrates a process of determining that a given receiver 204 requires maintenance at some future time within a defined time interval. The process illustrated by flow chart 300 may be repeated as needed for each receiver 204 being analyzed. Initially, in operation 304, the prediction module 256 receives test quantities from the test quantity module 248. As described above, each receiver 204 is associated with a time series of test quantities calculated by the test quantity module 248 using equation (3). Following operation 304, operation 308 may be executed. In operation 308, the prediction module 256 receives a figure of merit for each receiver 204 depending on the receiver's geographic locale. As described above, a figure of merit may be calculated by using equation (4). The prediction module may consider a group of receivers that have a common geographic locale. In this case, operation 308 may include receiving a signal figure of merit from the figure of merit module 252. Operation 312 may be executed following operation 308.

In operation 312, the prediction module 256 uses the time series of test quantities and the figure of merit to determine if the signal quality for a particular receiver 204 is acceptable. These discrete quantities are used to screen out receivers that can be identified as having a signal quality that is not likely to fall to an unacceptable level during the time interval. Here, the prediction module 256 makes a rough calculation based on whether the values of TQ are greater than the FoM, based on whether the TQs are increasing or not, and based on the definition of a window. Specifically, the prediction module may select two subsets of these points by means of two integers n<m<window_size; and keeps only those receivers 204 that satisfy one of the following two conditions:

The last m points are less than the FoM, and the last n
  points are decreasing; or (5)

The last m points are decreasing, and the last n points
  are less than the FoM. (6)

In so doing, the prediction module removes receivers 204 that are not in a bad condition, and thereby improves the overall performance speed of the entire algorithm.

If the time series of test quantities and the figure of merit indicate that the signal quality is acceptable, operation 324 may be executed following operation 312. In operation 324, the receiver is not considered a candidate for analysis, so the process may end. If the time series of test quantities and the figure of merit indicate that the signal quality is not necessarily acceptable, operation 316 may be executed following operation 312.

In operation 316, prediction module applies a linear regression and spike removal technique to the time series of test quantities to produce a linear function for the receiver 204. The linear function produced in operation 316 includes a slope and an intercept. The process of linear regression and spike removal is described in greater detail below in connection with FIG. 4. Operation 320 may be executed following operation 316. In operation 320, the slope and intercept obtained in operation 316 are used to determine if the receiver will experience an unacceptable signal quality at some future point during the time interval. This will be the case if the following inequality is satisfied:

$$(\bar{\omega}+\epsilon)\cdot \text{slope}+\text{intercept}<\delta\cdot FoM. \quad (7)$$

In inequality (7), $\bar{\omega}$ is the window size and E and δ are small constants. The actual values of parameters ε and δ are not meant to constrict the range of this algorithm. Such values are a matter of fine tuning. The left hand, or lower, side of this inequality is the value of the signal strength that should occur at the end of the processing period, at least according to the linear regression which was constructed for the receiver. The right hand, or upper, side of the inequality represents a marginal value of signal strength. In other words, inequality (7) may be interpreted to say that the receiver in question is predicted to have a very low level of signal strength at the end of the window, possibly even negative. The existence of such receivers can be demonstrated on the basis of the statistical properties of communication channels.

For receivers that satisfy inequality (7), operation 324 may follow operation 320. Here, the linear function derived for the receiver 204 indicates that an unacceptable signal quality will not occur at a future time within the time interval. For receivers that do satisfy inequality (7), operation 328 may follow operation 320. Here, the linear function derived for the receiver 204 indicates that an unacceptable signal quality will occur at a future time within the time interval. In this instance, the prediction module 256 predicts a future poor signal quality for a particular receiver 204, and so the service provider 104 may initiate a maintenance call or "truck roll" for the household 108a-n associated with particular receiver 204.

Figure 4:
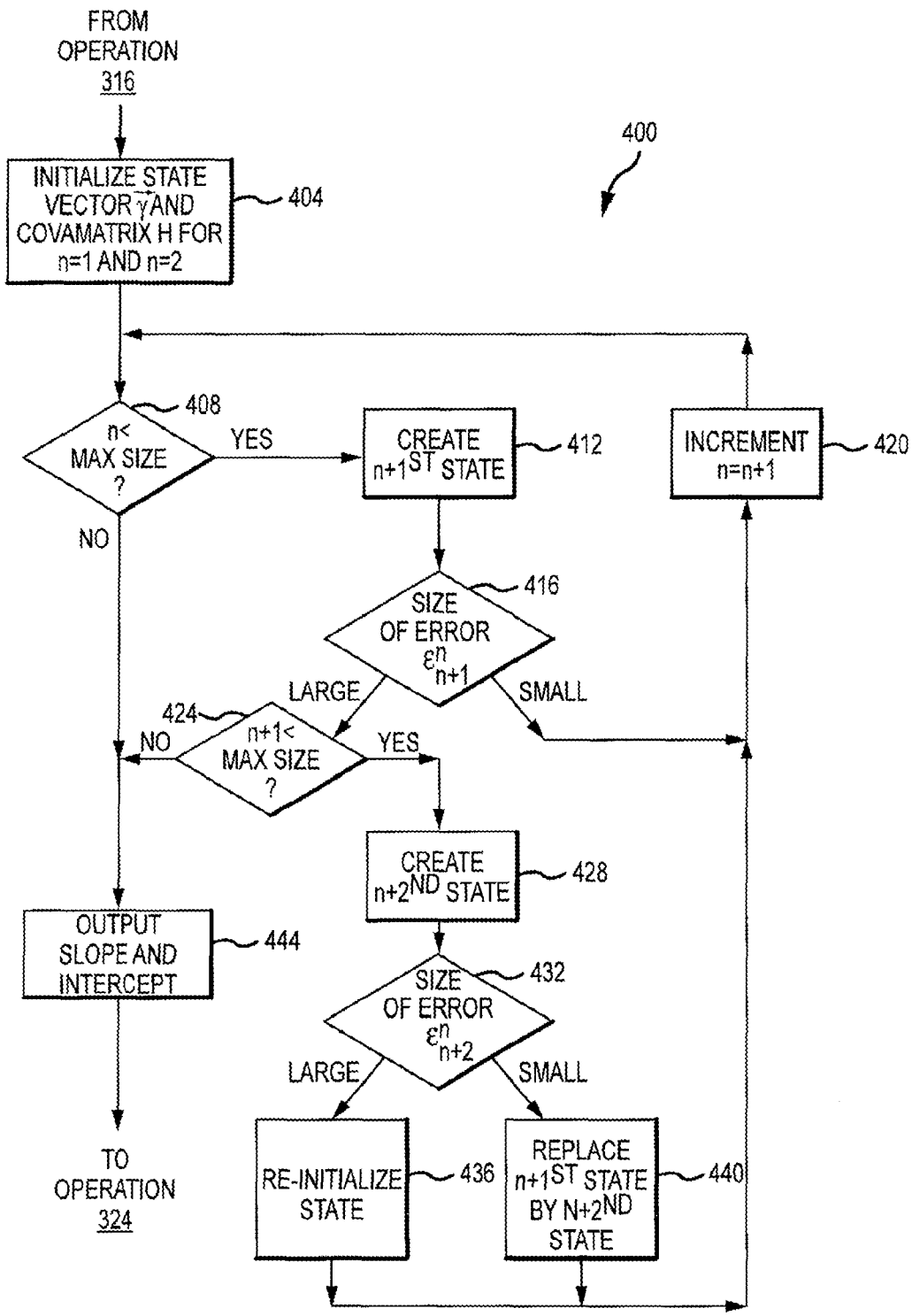
FIG. 4 is a flow chart that further illustrates the operation of the prediction module shown in FIG. 2.

Turning now to FIG. 4, a flow chart 400 is shown which illustrates a linear regression and spike removal method in accordance with implementations discussed herein. Flow chart 400 is a further explanation of operation 316 shown in FIG. 3. Experience has shown that signal histories are generally noisy, but such noise appears to be superimposed over straight segments which are separated by sudden jumps. In order to extract the underlying behavior, the linear regression can be applied. Sudden jumps can be detected and removed by formulating the technique of linear regression in a recursive manner. General concepts of recursive linear regression will first be discussed. Following this, a linear regression and spike removal method in accordance with embodiments discussed herein will be discussed.

Given a sequence of independent data $\{x_k\}_{k=1}^N$, and dependent data $\{y_k\}_{k=1}^N$, the objective of linear regression is to generate a slope a and intercept b so that the straight line y=a·x+b is a "good" approximation in the sense that $$y_k \approx a \cdot x_k + b + \epsilon_k \text{ for } k=1, \ldots, N, \qquad (8)$$

Where the sequence of errors $\{\epsilon_k\}_{k=1}^N$ form a mean zero, stochastic process. The input data may be expressed as a pair of n-dimensional vectors, say $\vec{x}$ and $\vec{y}$, respectively. For each integer n, we monitor their current parameters by means of a two-dimensional "state" vector, $\vec{\gamma} = \vec{\gamma}_{(n)}$ and its associated 2×2 error matrix $H=H_{(n)}$. These quantities are defined as $$\vec{\gamma} \equiv \begin{bmatrix} a \\ b \end{bmatrix}, \qquad (9)$$

and $$H \equiv \begin{bmatrix} \vec{x}^T \\ \vec{\delta}^T \end{bmatrix} \circ [\vec{x} \; \vec{\delta}],$$

where $$\vec{\delta}^T = (1, 1, \ldots, 1)$$

Normally, the slope and intercept can be computed in batch mode, where all the information is handled at once. However, there are situations in which it is better to process each point separately, as it arrives. In this case, after processing n points, the next piece of data, $(x_{n+1}, y_{n+1})$, is handled by first creating a pair of auxiliary vectors: $\vec{\xi}^T = (x_{n+1}, 1)$ and $\vec{\tau} = [H]^{-1}\vec{\xi}$. The new covariance matrix is $H_{n+1} = H_n + \vec{\xi} \otimes \vec{\xi}^T$. The update equation for the state vector requires an "innovation," which is the scalar quantity $\Delta \equiv y_{n+1} + \langle \vec{\xi}, \vec{\gamma} \rangle$; and, the new state vector is given by $$\vec{\gamma}_{(n+1)} = \vec{\gamma}_{(n)} + \frac{\Delta}{r^2 + \langle \vec{\xi}, \vec{\tau} \rangle} \cdot \vec{\tau}. \qquad (10)$$

In the interests of smoothing a known sequence of input data, it is useful to look at the error created in passing from the kth to the mth state configuration. This is the quantity $$\varepsilon_m^k \equiv \frac{1}{r} \langle H_{(k)}(\vec{\gamma}_{(m)} - \vec{\gamma}_{(k)}), \vec{\gamma}_{(m)} - \vec{\gamma}_{(k)} \rangle^{\frac{1}{2}}. \qquad (11)$$

It is a natural generalization of the stochastic error $\epsilon_k$ that appears in equation (8).

In operation 404 of FIG. 4, the prediction module 256 initializes a state vector for the receiver. The sequence $$\{\varepsilon_{n+1}^n\}_{n=3}^N$$

represents the error in passing from the nth state to the n+1st state. The prediction module 256 defines the mean $\lambda = \lambda_{(n)}$ and variance $\rho^2 = \rho^2_{(n)}$, of this sequence of numbers in the usual statistical sense. In operation 416, a determination is made about the most recent value $\epsilon_{n+1}^n$. It is 'large' whenever it is found to lie k sigma outside the mean. Otherwise, the error is said to be 'small'. In the latter situation, the prediction module 256 decides that the signal is tracking according to the current straight line, and the operation passes to the next input point (operation 420).

In the former case, when the error is large, operation 428 follows operation 416. In operation 428, there are two possibilities to consider: either the signal has jumped to a new linear segment (operation 436), or else a spike has been encountered (operation 440). The latter generally represents a transient condition in the broadcast, say as caused by a weather outage, or a power surge. The change may be a sudden increase or decrease; but either way, the prediction module 256 decides that the disturbance will be gone when the next data point is obtained. As long as there are more data points to process, that is, whenever n+1<max size=N (operation 424), the error committed in passing from the nth state to the n+2nd state, $\epsilon_{n+2}^n$, is examined (operation 428).

When this new error is large (in the above sense), the prediction module 256 assumes that a new line segment has been encountered; and this requires a new sequence of state vectors be constructed. In this case, the state vector is re-initialized (operation 436); and processing returns to the input stream to pick up the next data point (operation 420). When the new error is small (operation 440), it is assumed that the original jump was, in fact, a temporary phenomenon. That value of the input data is removed from consideration; and the operation passes to the next available point (operation 420). When the data stream is exhausted (operation 408), the output of the processing (operation 444) of flow chart 400 is the slope a and intercept b as found in the final state vector $\vec{\gamma}_{(n)}$.

In accordance with embodiments discussed herein the algorithm of method shown in FIG. 4 may be "fine tuned." First, the look-forward, from n+1 to n+2, certainly depends upon the granularity of the input data, and may be adjusted accordingly. That is, the look-forward may use more than two additional states. Inside the two error-size diamonds, (operation 416) and (operation 432), the notions of 'large' and 'small' depend upon the choice of the number, k, of sigma as mentioned above. This may be chosen to be the value two or three, but other values certainly fall within the purview of this algorithm. Finally, the re-initialization operation (operation 436) at the bottom the diagram has not been indicated, but any reasonable method is included within the scope of the overall algorithm.

The foregoing merely illustrates certain principles of embodiments. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, contain the principles of the embodiments and are thus within the spirit and scope of the present invention. From the above description and drawings, it will be understood by those of ordinary skill in the art that the particular embodiments shown and described are for purposes of illustration only and are not intended to limit the scope of the present invention. References to details of particular embodiments are not intended to limit the scope of the invention.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method to predict a maintenance condition of a receiver, comprising:
   determining a time series of test quantities for the receiver, the test quantities based on signal strength measurements collected at the receiver at a plurality of time instances;
   receiving a figure of merit for the receiver, the figure of merit indicating an expected signal quality for the receiver;
   eliminating the receiver as a candidate for failure prediction if the time series of test quantities is equal or greater than the figure of merit for a predetermined period of time;
   determining a failure prediction for the receiver based on the time series of test quantities and the figure of merit, the act of determining the failure prediction only performed if the receiver is not eliminated as a candidate for failure prediction; and
   identifying the receiver if the failure prediction indicates a future unacceptable signal strength for the receiver.

2. The method of claim 1, further comprising:
   eliminating the receiver as a candidate for failure prediction if the time series of test quantities trends level or trends upward for a predetermined number of time instances.

3. The method of claim 1, further comprising:
   applying recursive linear regression to the time series of test quantities and the figure of merit to produce a linear function, wherein the linear function is used to determine the failure prediction for the receiver; and
   rejecting a particular test quantity from the recursive linear regression if the particular test quantity indicates a transient condition.

4. The method of claim 3, further comprising:
   calculating a first error for the linear function based on a particular test condition, the first error corresponding to a predicted signal strength for a first time instance subsequent to a time instance of the particular test quantity;
   if the first error is greater than a predetermined error threshold, calculating a second error for the linear function based on the particular test condition, the second error corresponding to a predicted signal strength for a second time instance subsequent to the time instance of the particular test quantity; and
   if the second error is less than a predetermined error threshold, determining that the particular test quantity indicates a transient condition.

5. The method of claim 1 wherein the figure of merit indicates an expected signal quality for receivers in a geographic region in which the receiver is located.

6. A method to predict a maintenance condition of a receiver, comprising:
   storing a time series of test quantities for the receiver, the test quantities based on signal strength measurements collected at the receiver at a plurality of time instances;
   storing a figure of merit for the receiver, the figure of merit indicating an acceptable signal quality for the receiver;
   eliminating the receiver as a candidate for failure prediction if the time series of test quantities trends level or trends upward for a predetermined number of time instances;
   producing a failure prediction for the receiver based on the time series of test quantities and the figure of merit, the act of producing the failure prediction conditionally performed if the receiver is not eliminated as a candidate for failure prediction; and
   identifying the receiver if the failure prediction indicates a future unacceptable signal strength for the receiver.

7. The method of claim 6, further comprising:
   eliminating the receiver as a candidate for failure prediction if the time series of test quantities is equal or greater than the figure of merit for a predetermined period of time.

8. The method of claim 6, further comprising:
   computing a linear function with a recursive linear regression algorithm applied to the time series of test quantities and the figure of merit, the linear function used to produce the failure prediction for the receiver; and
   rejecting a particular test quantity from the recursive linear regression if the particular test quantity indicates a transient condition.

9. The method of claim 6 wherein the figure of merit indicates an acceptable signal quality for receivers during a fixed time interval.

10. The method of claim 6 wherein the figure of merit indicates an acceptable signal quality for receivers in a geographic region in which the receiver is located.

11. A system to provide maintenance to a receiver, comprising:
    a memory module configured to store a time series of test quantities for a receiver and a figure of merit for the receiver, the time series of test quantities derived from signal strength measurements collected over time at the receiver and the figure of merit corresponding to an acceptable signal quality for the receiver; and
    a prediction module configured to:
      remove the receiver as a candidate for maintenance if the time series of test quantities is acceptable relative to the figure of merit for a predetermined period of time; and
      predict a maintenance condition for the receiver based on the time series of test quantities and the figure of merit, the act of predicting the maintenance condition only performed if the receiver is not removed as a candidate for maintenance.

12. The system of claim 11 wherein the prediction module is further configured to:
   remove the receiver as a candidate for maintenance if the time series of test quantities trends level or trends toward a more acceptable value for a predetermined number of time instances.

13. The system of claim 11 wherein the prediction module is further operable to:
   apply recursive linear regression to the time series of test quantities to compute a linear function from the time series of test quantities; and
   reject a particular test quantity from the linear regression if the particular test quantity is indicative of a transient condition.

14. The system of claim 13 wherein the prediction module is further operable to:
   calculate a first error for the linear function based on a particular test condition, the first error corresponding to a predicted signal strength for a first time instance subsequent to a time instance of the particular test quantity;
   if the first error is greater than a predetermined error threshold, calculate a second error for the linear function based on the particular test condition, the second error corresponding to a predicted signal strength for a second time instance subsequent to the time instance of the particular test quantity; and
   if the second error is less than a predetermined error threshold, determine that the particular test quantity is indicative of a transient condition.

15. The system of claim 11 wherein a receiver is removed as a candidate for maintenance for a fixed time interval.

16. A system to provide maintenance to a receiver, comprising:
   a memory module configured to store a time series of test quantities for a receiver and a figure of merit for the receiver, the time series of test quantities derived from signal quality measurements collected over time at the receiver and the figure of merit corresponding to an expected signal quality for the receiver; and
   a prediction module configured to perform at least one of:
      removing the receiver as a candidate for maintenance if the time series of test quantities trends level or trends toward a more acceptable value for a predetermined number of time instances; and
      removing the receiver as a candidate for maintenance if the time series of test quantities is acceptable relative to the figure of merit for a predetermined period of time;
   wherein the prediction module is further configured to predict a maintenance condition for the receiver based on the time series of test quantities and the figure of merit, the act of predicting the maintenance condition only performed if the receiver is not removed as a candidate for maintenance.

17. The system of claim 16 wherein each signal quality measurement is representative of signal strength taken at the receiver.

18. The system of claim 16 wherein the prediction module is further operable to:
   apply recursive linear regression to the time series of test quantities to compute a linear function from the time series of test quantities; and
   reject a particular test quantity from the linear regression if the particular test quantity is indicative of a transient condition.

19. The system of claim 18 wherein the prediction module is further operable to:
   calculate a first error for the linear function based on a particular test condition, the first error corresponding to a predicted signal strength for a first time instance subsequent to a time instance of the particular test quantity;
   if the first error is greater than a predetermined error threshold, calculate a second error for the linear function based on the particular test condition, the second error corresponding to a predicted signal strength for a second time instance subsequent to the time instance of the particular test quantity; and
   if the second error is less than a predetermined error threshold, determine that the particular test quantity is indicative of a transient condition.

20. The system of claim 16 wherein a receiver is removed as a candidate for maintenance for a fixed time interval.

* * * * *